3,532,700
2-LOWER ALKYL-2,3-DIHYDROTHIENO(3,2-c)
QUINOLINES AND PHARMACEUTICALLY
ACCEPTABLE NON-TOXIC SALTS THEREOF
Yasuo Makisumi, Nishinomiya-shi, Japan, assignor to
Shionogi & Co., Ltd., Osaka, Japan
No Drawing. Continuation-in-part of application Ser. No.
616,765, Feb. 17, 1967. This application July 24, 1968,
Ser. No. 747,072
Claims priority, application Japan, Feb. 17, 1966,
41/9,728, 41/9,729, 41/9,730, 41/9,731; May 9,
1968, 43/31,145
Int. Cl. C07d *33/60*
U.S. Cl. 260—283                              4 Claims

ABSTRACT OF THE DISCLOSURE

2 - lower alkyl - 2,3 - dihydrothieno[3,2 - c]quinolines and pharmaceutically acceptable non-toxic salts thereof synthesized from 4-allyl- or 4-(1-lower alkyl-allyl)-thioquinoline, 3-allyl- or 3-(3-lower alkyl-allyl)-4-hydroxyquinoline, 3-allyl- or 3-(3-lower alkyl-allyl)-4-halogenoquinoline, 3-allyl- or 3-(3-lower alkyl-allyl)-4-mercaptoquinoline or 3-(2-halogenopropyl) or 3-(2-halogeno-3-lower alkyl-propyl)-4-halogenoquinoline, showing strong antipyretic, analgesic and anti-inflammatory activities with a low toxicity.

The present application is a continuation-in-part of copending application Ser. No. 616,765, filed Feb. 17, 1967, now abandoned.

This invention relates to a 2-lower alkyl-2,3-dihydrothieno[3,2-c]quinoline and pharmaceutically acceptable non-toxic salts thereof. It relates further to processes for their preparations. Furthermore, it relates to intermediates for synthesizing the aforementioned compounds.

The said 2-lower alkyl-2,3-dihydrothieno[3,2-c]-quinoline may be represented by the following formula:

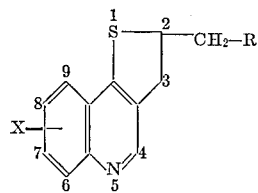

wherein R is a hydrogen atom or a lower alkyl group (e.g. methyl, ethyl, propyl, isopropyl, butyl, pentyl) and X is a hydrogen atom, a halogen atom (e.g. chlorine, bromine, iodine) or a lower alkoxy group (e.g. methoxy, ethoxy, propoxy, butoxy).

Previously, H. Andersag et al. synthesized 4-methyl-2,3-dihydrothieno[3,2-c]quinoline and found that it is useful in chemotherapy because of analgesic and analeptic properties (U.S. Pat. No. 2,650,226). 2-lower alkyl-2,3-dihydrothieno[3,2-c]quinolines (I) of the present invention, however, are structurally characterized in the absence of substituent on the quinoline nucleus, when compared with this known thienoquinoline derivative. The inventor has now discovered that the 2-lower alkyl-2,3-dihydrothieno[3,2-c]quinolines of Formula I have unexpectedly excellent antipyretic, analgesic and anti-inflammatory activities, which are remarkably superior to those of the prior compound of H. Andersag et al. in spite of the structural similarity and also to those of a commercially available agent, e.g. aminopyrine, phenylbutazone. Further, it may be noted that the toxicity of the compounds of Formula I is retained at a very low level.

Accordingly, a basic object of the present invention is to provide novel thieno[3,2-c]quinoline derivatives and processes for their production. Another object of the invention is to provide thieno[3,2-c]quinoline derivatives showing strong antipyretic, analgesic and anti-inflammatory activities with a low toxicity. A further object of the invention is to provide novel intermediates for synthesizing the said compounds. These and other objects and the manner in which they are accomplished will become apparent to those conversant with the art from the following description of the general class of compounds and certain specific examples of particular members as well as general and specific method for their production.

The 2-lower alkyl-2,3-dihydrothieno[3,2-c]quinolines of Formula I may be prepared in a variety of different ways of which the general aspect may be illustrated by the following scheme:

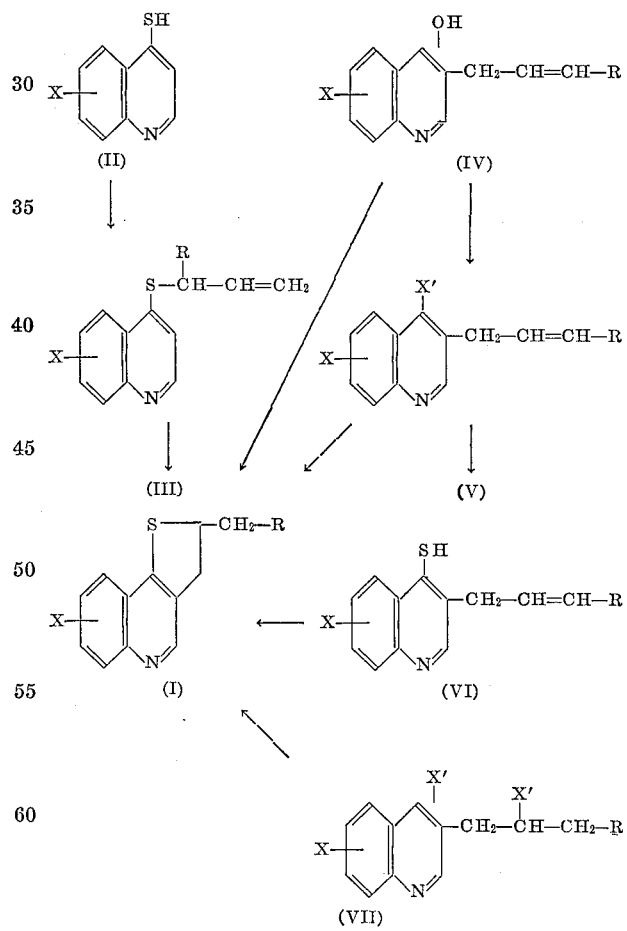

wherein X' is a halogen atom (e.g. chlorine, bromine or iodine) and R and X each has the same significance as designated above.

As illustrative of the objective compounds of Formula I are 2-methyl-2,3-dihydrothieno[3,2-c]quinoline, 2-ethyl-2,3-dihydrothieno[3,2-c]quinoline, 2-propyl-2,3-dihydrothieno[3,2-c]quinoline, 2-butyl-2,3-dihydrothieno[3,2-c]quinoline, 2 - isobutyl - 2,3 - dihydrothieno[3,2-c]quinoline, 2 - methyl - 6 - chloro - 2,3 -dihydrothieno[3,2 - c]quinoline, 2 - methyl - 7 - chloro-2,3 - dihydrothieno [3,2 - c]quinoline, 2 - ethyl - 7 - bromo - 2,3 - dihydrothieno[3,2-c]quinoline, 2-propyl - 7 - iodo - 2,3 - dihydrothieno[3,2-c]quinoline, 2-methyl-8-chloro-2,3-dihydrothieno[3,2-c]quinoline, 2-propyl-8-bromo-2,3-dihydrothieno[3,2 - c]quinoline, 2 - isobutyl - 8 - iodo - 2,3 - dihydrothieno[3,2-c]quinoline, 2-methyl-7-methoxy-2,3-dihydrothieno[3,2-c]quinoline, 2-isopropyl-7-ethoxy-2,3-dihydrothieno[3,2-c]quinoline, 2-butyl-7-propoxy-2,3-dihydrothieno[3,2-c]quinoline, 2-methyl-8-methoxy-2,3-dihydrothieno[3,2-c]quinoline, 2-ethyl-8-ethoxy-2,3-dihydrothieno[3,2-c]quinoline, 2-isobutyl-8-propoxy-2,3-dihydrothieno[3,2-c]quinoline and the like.

According to the present invention, the compounds of Formula I can be produced by some different methods, which are illustrated in detail below, respectively.

(1) Preparation from 4-mercaptoquinoline (II)

4-mercaptoquinoline (II) is first made to react with an allyl halide or an 1-lower alkyl-allyl halide to obtain a corresponding 4-allyl- or 4-(1-lower alkyl-allyl)-thioquinoline (III). As illustrative of the halide are allyl chloride, allyl bromide, allyl iodide, 1-methyl-allyl chloride, 1-ethyl-allyl bromide, 1-propyl-allyl bromide, 1-isopropyl-allyl bromide and the like. This reaction is usually carried out in the presence of a basic substance such as an alkali metal hydroxide, an alkali metal alkoxide, an alkali metal carbonate, an alkali metal hydrogen carbonate, an alkaline earth metal hydroxide, a pyridine base (e.g. pyridine, picoline, collidine) and a tertiary amine (e.g. triethylamine, dimethylaniline). A suitable inert solvent may be employed in this reaction, such as a lower alkanol (e.g. methanol, ethanol, propanol), a lower aliphatic ketone (e.g. acetone, methylethylketone) and the like. Most preferably, the reaction is executed in a lower alkanol containing an alkali metal alkoxide under heating.

Subsequently, the thus prepared 4-allyl- or 4-(1-lower alkyl-allyl)-thioquinoline (III) is subjected to the ring closure reaction to obtain the objective compound, 2-lower alkyl-2,3-dihydrothieno[3,2-c]quinoline (I). This ring closure reaction is considered to proceed via a corresponding 3-allyl- or 3-(3-lower alkyl-allyl)-4-mercaptoquinoline (VI) which is formed by migration of the allyl type substituent attached to the sulfur atom of the compound (III) to the ortho position, i.e. the 3-position. In this reaction, however, the intermediary compound (VI) usually cannot be isolated because of its strong tendency to form the thiophene ring. For the purpose of the ring closure reaction, the 4-allyl- or 4-(1-lower alkyl-allyl)-thioquinoline (III) is heated at a temperature ranging from about 150 to about 300° C., preferably from about 200 to about 250° C. Although the reaction can be executed without a reaction solvent, there may be employed such an inert solvent having a high boiling point as diphenyl ether, nitrobenzene, naphthalene, methylnaphthalene, dimethylaniline, quinoline or collidine.

The starting material of this procedure, 4-mercaptoquinoline (II) can be prepared, for example, from well known 4-hydroxyquinoline by subjecting it to halogenation with phosphorus oxyhalide and treating the resulted 4-halogenoquinoline with thiourea or an alkali metal hydrogen sulfide.

In the present specification, it should be understood that 4-hydroxy- or 4-mercapto-quinoline derivatives are nominated as enol compounds for the convenience of illustration, their tautomerisms being disregarded.

(2) Preparation from 3-allyl- or 3-(3-lower alkyl-allyl)-4-hydroxyquinoline (IV)

3-allyl- or 3-(3-lower alkyl-allyl)-4-hydroxyquinoline (IV) can be converted to the objective 2-lower alkyl-2,3-dihydrothieno[3,2-c]quinoline (I). The reaction is carried out by heating the compound of Formula IV with phosphorus pentasulfide as a mercapto group-introducing agent, preferably in a suitable inert solvent such as benzene, toluene, xylene, decaline, naphthalene, pyridine, collidine, quinoline or dioxane. The reaction temperature may be selected from the range from about 50 to 300° C., preferably from about 100 to 200° C. The reaction is considered to proceed via the compound (VI), but the latter usually cannot be isolated for the same reason as mentioned above.

The starting material, 3-allyl- or 3-(3-lower alkyl-allyl)-4-hydroxyquinoline (IV) can be prepared, for example, from well known 4-hydroxyquinoline by treating it with a corresponding allyl halide and subjecting the resulted 4-allyl- or 4-(1-lower alkyl-allyl)-oxyquinoline to the so-called ortho-Claisen rearrangement under heating.

(3) Preparation from 3-allyl- or 3-(3-lower alkyl-allyl)-4-halogenoquinoline (V)

3-allyl- or 3-(3-lower alkyl-allyl)-4-halogenoquinoline (V) can also be converted to the objective 2-lower alkyl-2,3-dihydrothieno[3,2-c]quinoline (I) by heating in the presence of a mercapto group-introducing agent such as thiourea or an alkali metal hydrogen sulfide (e.g. sodium hydrogen sulfide, potassium hydrogen sulfide) at a temperature ranging from about 50 to about 300° C. The reaction may be carried out in an inert solvent and it is preferred to employ such a solvent having a high boiling point as amyl alcohol, ethylene glycol, propylene glycol, nitrobenzene, xylene, naphthalene, methylnaphthalene, dimethylaniline, quinoline or collidine. If the reaction is carried out at a low temperature, for instance, at 50 to 100° C., there may be produced a considerable amount of the intermediary mercapto compound (VI) besides the objective compound (I). But, in the case, the intermediary compound (VI) can easily be converted to the objective compound (I) by a further heating.

Accordingly, the preparation can be carried out in two steps, i.e. the compound (V) is first made to react with a mercapto group-introducing agent in a comparatively mild condition and the resulting intermediary compound (VI) is subjected to the ring closure reaction. For this purpose, It is preferred to execute the first step of the reaction at a temperature ranging from about 0 to 50° C., particularly at a room temperature (about 20° C.) in a suitable inert solvent such as a lower alkanol (e.g. methanol, ethanol), a lower aliphatic ketone (e.g. acetone, methylethylketone), pyridine or picoline. In the second step, the intermediary compound (VI) is heated at a temperature ranging from about 100 to about 300° C., preferably from about 150 to about 250° C. substantially in the same manner to the preparation (1), i.e. the use of the reaction solvent and/or the catalyst may be preferred.

The starting material, 3-allyl- or 3-(3-lower alkyl-allyl)-4-halogenoquinoline (V) can be prepared, for example, by heating a corresponding 4-hydroxy compound (IV) with phosphorus oxyhalide.

(4) Preparation from 3-(2-halogenopropyl)- or 3-(2-halogeno - 3 - lower alkyl-propyl) - 4 - halogenoquinoline (VII)

3-(2-halogenopropyl)- or 3-(2-halogeno-3-lower alkylpropyl)-4-halogenoquinoline (VII) can be converted to the objective 2 - lower alkyl - 2,3 - dihydrothieno[3,2-c]quinoline (I). The reaction is carried out by heating the compound of Formula VII in an inert solvent in the presence of a mercapto group-introducing agent such as thiourea or an alkali metal hydrogen sulfide (e.g. sodium hydrogen sulfide, potassium hydrogen sulfide) at a temperature ranging from about 50 to about 300° C. As illustrative of the reaction solvent are water, methanol, ethanol, propanol, butanol, ethylene glycol, propylene glycol and the like.

The starting material, 3-(2-halogenopropyl)- or 3-(2-halogeno-3-lower alkyl-propyl)-4-halogenoquinoline (VII) can be prepared, for example, from known 2-(N-phenylaminomethylidene) - 4 - lower alkyl-γ-butyrolactone by treating it with phosphorus oxyhalide.

In some of the ring closure reactions mentioned above, a catalyst such as a Lewis acid (e.g. zinc chloride, boron trifluoride, boron trichloride, aluminum chloride), hydrogen halide, acetic acid or pyridine hydrochloride may be used for improving the yield and/or lowering the reaction temperature.

Since the thus produced 2-lower alkyl-2,3-dihydrothieno[3,2-c]quinoline (I) is usually a liquid substance or a solid substance having a comparatively low melting point, it may be converted into its acid addition salt, for instance, by treating the former with an acid such as hydrochloric, hydrobromic, hydroiodic, sulfuric, nitric, phosphoric, thiocyanic, carbonic, acetic, propionic, oxalic, citric, tartaric, succinic, salicylic, benzoic or palmitic acid in a suitable solvent such as water, methanol, ethanol, benzene and toluene. There are the thus produced hydrochloride, hydrobromide, hydroiodide, sulfate, nitrate, phosphate, thiocyanate, carbonate, acetate, propionate, oxalate, citrate, tartrate, succinate, salicylate, benzoate, palmitate and the like.

The 2 - lower alkyl - 2,3-dihydrothieno[3,2-c]qninoline (I) and its non-toxic salt are useful as antipyretic, analgesic and anti-inflammatory agents. For example, the animal test data of a typical product of the present invention, 2 - methyl - 2,3-dihydrothieno[3,2-c]quinoline hydrochloride, are shown in the following Table 1, in contrast with the most closely related known compound, i.e. 4 - methyl - 2,3-dihydrothieno[3,2-c]quinoline hydrochloride, and a commercially available and frequently used agent, i.e. aminopyrine.

TABLE 1.—PHARMACOLOGICAL PROPERTIES OF 2-METHYL-2,3-DIHYDROTHIENO-[3,2-c] QUINOLINE HYDROCHLORIDE DETERMINED SUBCUTANEOUSLY

| Pharmacological property | Toxicity [1] ($LD_{50}$, mg./kg.) | Antipyretic [2] activity (° C.) | Analgesic [3] activity ($ED_{50}$, mg./kg.) |
|---|---|---|---|
| Test compound: | | | |
| 2-methyl-2,3-dihydrothieno-[3,2-c] quinoline hydrochloride | 800–1,000 | −5.22 | 21 |
| 4-methyl-2,3-dihydrothieno-[3,2-c] quinoline hydrochloride | 260 | −1.24 | 60 |
| Aminopyrine | 373 | [4] −2.99 | 48 |

[1] Toxicity is determined in mice by subcutaneous administration.
[2] Antipyretic activity is presented by depression of the bodily temperature in mice, when treated subcutaneously with a dose of 50 mg./kg. of the test compound.
[3] Analgesic activity is determined subcutaneously in mice by inhibition of the stretching caused by 2-phenyl-1,4-benzoquinone.
[4] 100 mg./kg.

From the test data listed in the Table 1, it is apparent that the antipyretic and analgesic activities of 2-methyl-2,3-dihydrothieno[3,2-c]quinoline hydrochloride are remarkably stronger than those of 4-methyl-2,3-dihydrothieno[3,2-c]quinoline hydrochloride and aminopyrine. Furthermore, the toxicity of 2-methyl-2,3-dihydrothieno-[3,2-c]quinoline hydrochloride is about ⅓–¼ of that of 4 - methyl - 2,3-dihydrothieno[3,2-c]quinoline hydrochloride and about ½–⅓ of that of aminopyrine.

These pharmacological properties are also ascertained in a variety of the products of the present invention by oral administration, the results being shown in the following Table 2.

TABLE 2.—PHARMACOLOGICAL PROPERTIES OF SOME TYPICAL 2-LOWER ALKYL-2,3-DIHYDROTHIENO[3,2-c] QUINOLINES DETERMINED ORALLY

| Pharmacological property | Toxicity [1] ($LD_{50}$, mg./kg.) | Antipyretic [2] activity (° C.) | Analgesic [3] activity ($ED_{50}$, mg./kg.) |
|---|---|---|---|
| Test compound: | | | |
| 2-methyl-2,3-dihydrothieno-[3,2-c] quinoline hydrochloride | 639 | −5.57 | 113 |
| 2-ethyl-2,3-dihydrothieno-[3,2-c] quinoline hydrochloride | 800 | −4.50 | 237 |
| 2-methyl-8-chloro-2,3-dihydrothieno-[3,2-c]quinoline hydrochloride | 1,000 | −4.57 | 77 |
| 2-methyl-7-methoxy-2,3-dihydrothieno-[3,2-c]quinoline hydrochloride | 1,000 | −3.03 | 97 |

[1] Toxicity is determined in mice by oral administration.
[2] Antipyretic activity is presented by depression of the bodily temperature in mice, when treated orally with a dose of 250 mg./kg. of the test compound.
[3] Analgesic activity is determined orally in mice by inhibition of the stretching caused by 2-phenyl-1,4-benzoquinone.

Furthermore, the compounds of the present invention show a marked anti-inflammatory activity. For example, when the inhibition activity against the edema caused by a phlogistic agent, carrageenin, is examined in rats by oral administration of a dose of 100 mg./kg. of the test compound, 2-methyl-2,3-dihydrothieno[3,2-c]quinoline hydrochloride and 2-methyl-8-chloro-2,3-dihydrothieno[3,2-c]-quinoline hydrochloride show 61.0% inhibition and 60.7% inhibition, respectively, whereas a commercially available anti-inflammatory agent, phenylbutazone, shows 44.3% inhibition.

The other 2-lower alkyl-2,3-dihydrothieno[3,2-c]quinolines and non-toxic acid addition salts thereof provided by the present invention also show similarly excellent pharmacological properties. Accordingly, the compounds of Formula I and pharmaceutically acceptable non-toxic salt thereof are useful as antipyretic, analgesic and anti-inflammatory agents of a low toxicity, which can be administered in dosage unit form, as carried by a suitable pharmaceutical carrier, to human beings particularly for relieving fever, pain and/or inflammation. Administration is advantageously effected orally in the form of conventionally prepared tablets or the like. Each tablet, or other per se conventional administration form, may contain e.g. 50 to 200 milligrams of active compound according to the invention and medication is continued at intervals prescribed e.g. by the attending physician until relief is attained.

The following examples illustrate methods of carrying out the present invention, but it is to be understood that these examples are given for the purpose of illustration only and not of limitation.

In the examples which follow, parts by weight bear the same relation to parts by volume as do grams to millilitres. Temperatures are set forth in degrees centigrade. The abbreviations have conventional significance.

EXAMPLE 1

Preparation of 4-allylthioquinoline

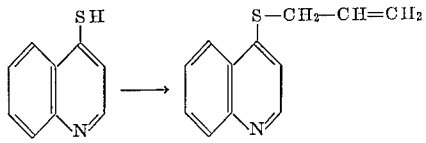

To a solution of 4-mercaptoquinoline (3.7 parts by weight) in ethanol (70 parts by volume) containing metallic sodium (0.76 part by weight) is added allyl bromide (4.0 parts by weight) and the mixture is heated for 5 hours under refluxing. After removal of the precipitated sodium bromide by filtration, the filtrate is concentrated under reduced pressure, and the residue is extracted with chloroform. The extract is washed with water, dried over anhydrous magnesium sulfate, and the solvent is removed. The oily residue is purified by distillation under reduced pressure to give 4-allylthioquinoline (3.95 parts by weight) as a pale orange-yellow oily substance boiling at 129 to 130° C./0.3 mm. Hg.

*Analysis.*—Calc'd for $C_{12}H_{11}NS$ (percent): C, 71.60; H, 5.88; N, 6.95. Found (percent): C, 71.41; H, 5.61; N, 6.85.

The picrate is constituted by yellow pillars melting at 191 to 192° C., when recrystallized from methanol.

*Analysis.*—Calcd. for $C_{12}H_{11}NS \cdot C_6H_3N_3O_7$ (percent): C, 50.22; H, 3.27; N, 13.01. Found (percent): C, 50.11; H, 3.47; N, 13.21.

EXAMPLE 2

Preparation of 2-methyl-2,3-dihydrothieno[3,2-c]-quinoline from 4-allylthioquinoline

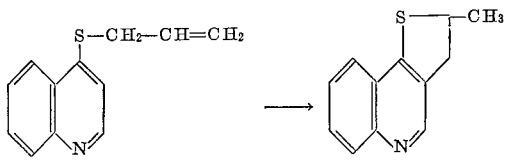

(a) 4-allylthioquinoline (2.0 parts by weight) is heated at 200° C. for 1 hour. The resultant reddish orange oily substance is chromatographed on alumina and the product is eluted with a mixture of benzene and ethyl acetate (7:1 by volume), which is further purified by distillation under reduced pressure to give 2-methyl-2,3-dihydrothieno[3,2-c]quinoline (1.4 parts by weight) as a pale yellow oily substance boiling at 141 to 142° C./0.05 mm. Hg. UV-spectrum, $\lambda_{max.}^{EtOH}$ m$\mu$ (log $\epsilon$): 227.5 (4.48), 243 (4.36), 320 (3.95), 333.5 (3.92).

*Analysis.*—Calcd. for $C_{12}H_{11}NS$ (percent): C, 71.60; H, 5.58; N, 6.95. Found (percent): C, 71.60; H, 5.74; N, 7.07.

The hydrochloride is constituted by colorless prisms melting at 196 to 197° C., when recrystallized from a mixture of ethanol and acetone.

In the reaction is also obtained bis(4-quinolyl)sulfide (0.77 part by weight) as colorless pillars melting at 145 to 146° C.

*Analysis.*—Calcd. for $C_{18}H_{12}N_2S$ (percent): C, 74.97; H, 4.19; N, 9.41. Found (percent): C, 74.81; H, 4.23; N, 9.48.

(b) A solution of 4-allylthioquinoline (10 parts by weight) in freshly distilled quinoline (30 parts by volume) is heated for 6 hours under reduced pressure (bath temperature 260° C.). After removal of quinoline under reduced pressure, the residue is chromatographed on alumina and the product is eluted with a mixture of petroleum ether and benzene, which is purified by distillation under reduced pressure to give 2-methyl-2,3-dihydrothieno-[3,2-c]quinoline (8.98 parts by weight) being identical with the authentic sample.

EXAMPLE 3

Preparation of 2-methyl-2,3-dihydrothieno[3,2-c]-quinoline from 3-allyl-4-hydroxyquinoline

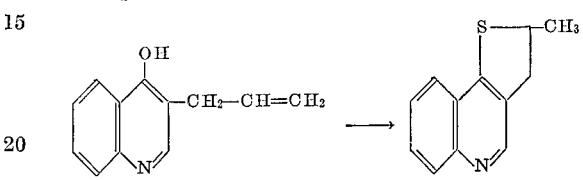

A solution of 3-allyl-4-hydroxyquinoline (2.0 parts by weight) and powdered phosphorus pentasulfide (2.2 parts by weight) in dioxane (25 parts by volume) is heated for 12 hours under refluxing. After cooling, the reaction mixture is made alkaline with 20% sodium hydroxide solution and extracted with ether. The extract is washed with water, dried over anhydrous magnesium sulfate and evaporated. The residue is chromatographed on alumina and the product is eluted with benzene, which is further purified by distillation under reduced pressure to give 2-methyl - 2,3 - dihydrothieno[3,2-c]quinoline (0.5 part by weight) being identical with the authentic sample.

EXAMPLE 4

Preparation of 3-allyl-4-mercaptoquinoline

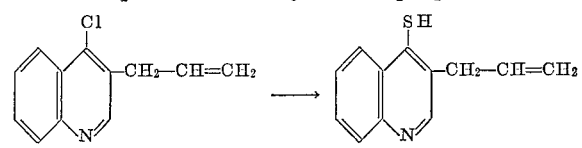

To a solution of 3-allyl-4-chloroquinoline (2.5 parts by weight) in anhydrous ethanol (10 parts by volume) is added another solution of thiourea (1.1 parts by weight) in anhydrous ethanol (35 parts by volume), and the mixture is allowed to stand at room temperature for 3 days. After removal of the solvent under reduced pressure, the residue is dissolved in water containing an equivalent amount of sodium carbonate is heated at 40° C. The precipitates are collected by filtration, treated with 10% sodium hydroxide solution, and the insoluble substances are extracted with chloroform. The aqueous layer is acidified with 20% acetic acid, the precipitates are collected by filtration, washed with water and dried. Recrystallization from ethyl acetate gives 3-allyl-4-mercaptoquinoline (1.9 parts by weight) as pale yellow pillars melting at 170 to 171° C.

*Analysis.*—Calcd. for $C_{12}H_{11}NS$ (percent): C, 71.60; H, 5.58; N, 6.95. Found (percent): C, 71.52; H, 5.57; N, 7.24.

EXAMPLE 5

Preparation of 2-methyl-2,3-dihydrothieno[3,2-c]-quinoline from 3-allyl-4-mercaptoquinoline

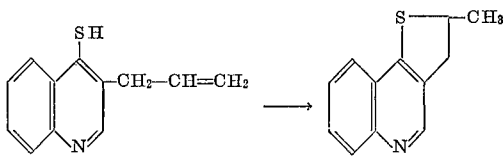

(a) A solution of 3-allyl-4-mercaptoquinoline (17.5 parts by weight) in 48% hydrobromic acid (53 parts by volume) and acetic acid (175 parts by volume) is heated for 2 hours under refluxing. After concentration, the residue is diluted with water, made alkaline with 20% sodium hydroxide solution and extracted with chloroform. The extract is washed with water, dried over anhydrous magnesium sulfate and evaporated. Chromatographic purification followed by distillation under reduced pressure gives 2-methyl-2,3-dihydrothieno[3,2-c]quinoline (15.6 parts by weight), which is identical with the authentic sample.

(b) A solution of 3-allyl-4-mercaptoquinoline (10 parts by weight) in freshly distilled quinoline (30 parts by volume) is heated for 6 hours under refluxing. After removal of the solvent under reduced pressure, the residue is treated in a substantially similar manner as described above to give 2-methyl-2,3-dihydrothieno-[3,2-c]quinoline (9.75 parts by weight), which is identical with the authentic sample.

(c) 4-allyl-3-mercaptoquinoline (20.1 parts by weight) is heated for 10 minutes at 180° C. (bath temperature), and chromatographed on alumina. The product is eluted with benzene, and purified by distillation under reduced pressure to give 2-methyl-2,3-dihydrothieno[3,2-c]quinoline (19.1 parts by weight), which is identical with the authentic sample.

EXAMPLE 6

Preparation of 2-methyl-2,3-dihydrothieno[3,2-c]-quinoline from 3-allyl-4-chloroquinoline

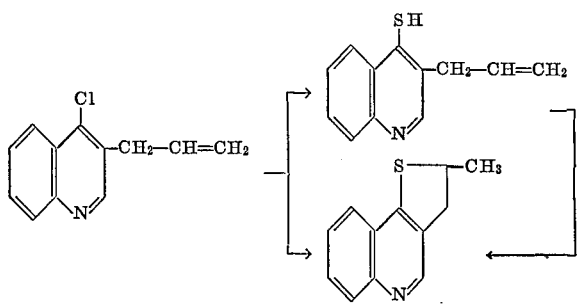

A solution of 3-allyl-4-chloroquinoline (4.1 parts by weight) and thiourea (1.6 parts by weight) in ethanol (40 parts by volume) is heated for 1 hour under refluxing. After removal of the solvent, the residue is diluted with water, made alkaline with a diluted solution hydroxide solution and extracted with ether. The extract is washed with water, dried over anhydrous magnesium sulfate and evaporated. Chromatographic purification followed by distillation under reduced pressure gives 2-methyl-2,3-dihydrothieno[3,2-c]quinoline (1.3 parts by weight) being identical with authentic sample.

The aqueous layers of the ether extraction is acidified with 10% acetic acid and the precipitates are collected by filtration. The precipitates are washed with water and dried to give 3-allyl-4-mercaptoquinoline (2.3 parts by weight) being identical with the authentic sample. This can be easily converted to 2-methyl-2,3-dihydrothieno-[3,2-c]quinoline by a similar procedure to that disclosed in the foregoing Example 5.

EXAMPLE 7

Preparation of 2-methyl-2,3-dihydrothieno[3,2-c]quinoline from 3-(2-chloropropyl)-4-chloroquinoline

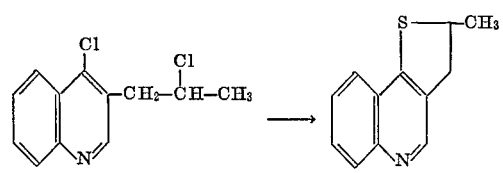

(a) A solution of 3-(2-chloropropyl)-4-chloroquinoline (2.4 parts by weight) and thiourea (0.836 part by weight) in ethanol (15 parts by volume) is heated for 2 hours under refluxing. After removal of the solvent, the residue is diluted with water, made alkaline with 10% sodium hydroxide solution and extracted with chloroform. The extract is washed with water, dried over anhydrous magnesium sulfate and evaporated. Chromatographic purification followed by distillation under reduced pressure gives 2-methyl-2,3-dihydrothieno[3,2-c]quinoline (2.0 parts by weight) being identical with the authentic sample.

(b) A solution of 3-(2-chloropropyl)-4-chloroquinoline (2.4 parts by weight) and sodium hydrogen sulfide (1.2 parts by weight) in ethanol (30 parts by volume) is heated for 1 hour under refluxing. After cooling, the precipitated sodium chloride is removed by filtration and the filtrate is evaporated. The residue is diluted with water, made alkaline with 10% sodium hydroxide solution and extracted with chloroform. The extract is washed with water, dried over anhydrous magnesium sulfate and evaporated. Chromatographic purification followed by distillation under reduced pressure gives 2-methyl-2,3-dihydrothieno[3,2-c]quinoline (2.0 parts by weight) being identical with the authentic sample.

In a similar manner to any one selected from the above-illustrated examples, other 2-lower alkyl-2,3-dihydrothieno[3,2-c]quinolines can be produced. Some of them can be exemplified as follows:

2-ethyl-2,3-dihydrothieno[3,2-c]quinoline

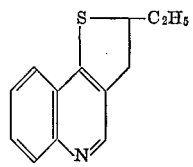

Free base: B.P. 139–140° C./0.15 mm. Hg
Hydrochloride: M.P. 185–188° C.

2-butyl-2,3-dihydrothieno[3,2-c]quinoline

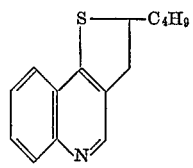

Free base: B.P. 149–150° C./0.06 mm. Hg
Hydrochloride: M.P. 173–176° C.

2-phenyl-2,3dihydrothieno[3,2-c]quinoline

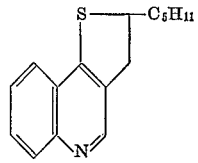

Free base: B.P. 147–150° C./0.05 mm. Hg
Hydrochloride: M.P. 175–177° C.

2-methyl-6-chloro-2,3-dihydrothieno[3,2-c]quinoline

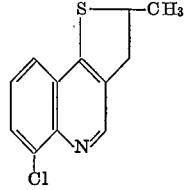

Free base: M.P. 74.5–75° C.
Hydrochloride: M.P. 158–160° C.

2-methyl-7-chloro-2,3-dihydrothieno[3,2-c]quinoline

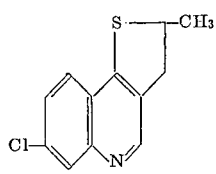

Free base: M.P. 70–71° C.
Hydrochloride: M.P. 180–182° C.

2-methyl-8-chloro-2,3-dihydrothieno[3,2-c]quinoline

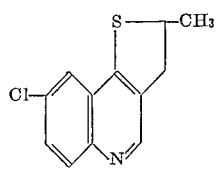

Free base: M.P. 57.5–58.5° C.
Hydrochloride: M.P. 210–211° C.

2-methyl-7-methoxy-2,3-dihydrothieno[3,2-c]quinoline

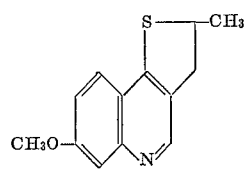

Free base: M.P. 64–65° C.
Tartrate: M.P. 147.5–148.5° C.

2-methyl-8-methoxy-2,3-dihydrothieno[3,2-c]quinoline

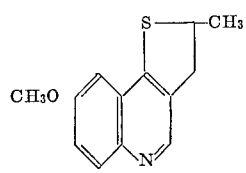

Free base: M.P. 91.5–92° C.
Hydrochloride: M.P. 243–243.5° C.

Likewise, some of the other intermediate compounds can be exemplified as follows:
4-allylthio-6-chloroquinoline (M.P. 35.5–36° C.); 4-allylthio-7-chloroquinoline (M.P. 53–54.5° C.); 4-allylthio-8-chloroquinoline (M.P. 73–75° C.); 4-allylthio - 6 - methoxyquinoline (B.P. 160° C./0.05 mm. Hg; picrate: M.P. 186–188° C.); 4-allylthio-7-methoxyquinoline (M.P. 79.5–81° C.); 4-(1-methylallyl)-thioquinoline (B.P. 112–113° C./0.03 mm. Hg; picrate: M.P. 186.5–187.5° C.); 3-(2-butenyl)-4-mercaptoquinoline (M.P. 175° C.); 3-(2-chloropropyl)-4-chloroquinoline (B.P. 139° C./0.03 mm. Hg; picrate: M.P. 146–147° C.); 3-(2-chloropropyl)-4,6-dichloroquinoline (picrate: M.P. 148–149° C.); 3-(2-chlorobutyl)-4-chloroquinoline (picrate: M.P. 150–151° C.); 3-(2-chlorohexyl)-4-chloroquinoline (picrate: M.P. 144–145° C.); 3-(2-chloroheptyl) - 4 - chloroquinoline (B.P. 156–158° C./0.35 mm. Hg; picrate: M.P. 135–138° C.); etc.

What is claimed is:
1. A member selected from the group consisting of the compounds of the formula:

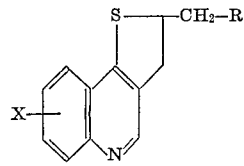

wherein R is a member selected from the group consisting of hydrogen atom and lower alkyl group and X is a member selected from the group consisting of hydrogen atom, halogen atom and lower alkoxy group, and pharmaceutically acceptable non-toxic salts thereof.

2. A compound according to claim 1, namely, 2-methyl-2,3-dihydrothieno[3,2-c]quinoline.

3. A compound according to claim 1, namely, 2-methyl-8-chloro-2,3-dihydrothieno[3,2-c]quinoline.

4. A member selected from the group consisting of the compounds of the formula:

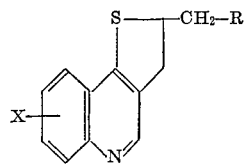

wherein R is a member selected from the group consisting of hydrogen atom and lower alkyl group and X is a member selected from the group consisting of hydrogen atom and halogen atom, and pharmaceutically acceptable non-toxic salts thereof.

References Cited

UNITED STATES PATENTS

| | | | |
|---|---|---|---|
| 2,427,286 | 9/1917 | Knapp et al. | 260—283 X |
| 2,500,142 | 3/1950 | Wiesehahn | 260—283 X |
| 2,650,226 | 8/1953 | Andersag et al. | 260—283 X |
| 2,650,229 | 8/1953 | Timmler et al. | 260—288 |
| 2,691,023 | 10/1954 | Horlein et al. | 260—289 X |
| 3,301,859 | 1/1967 | Cheney et al. | 260—289 X |

OTHER REFERENCES

Kuwayama et al.: Chem. Abstr. vol. 63, col. 591 (1965).

Kano et al.: Chem. Abstr., vol. 63, col. 18090 (1965) Abstracting French B.A.S.M. 3234.

DONALD G. DAUS, Primary Examiner

U.S. Cl. X.R.

260—286, 289; 424—258